United States Patent
Sandberg et al.

(10) Patent No.: US 7,051,534 B2
(45) Date of Patent: May 30, 2006

(54) GAS TURBINE ARRANGEMENT HAVING AN INTEGRATED FILTER HOUSING AND COMPRESSOR BLEED DUCT

(75) Inventors: Peter Sandberg, Dalsjöfors (SE); Tord Ekberg, Brämhult (SE); Peter Johansson, Timmele (SE)

(73) Assignee: Camfil AB (SE)

( * ) Notice: Subject to any disclaimer, the term of this patent is extended or adjusted under 35 U.S.C. 154(b) by 0 days.

(21) Appl. No.: 10/491,495

(22) PCT Filed: Oct. 1, 2001

(86) PCT No.: PCT/SE01/02118

§ 371 (c)(1),
(2), (4) Date: Aug. 25, 2004

(87) PCT Pub. No.: WO03/029629

PCT Pub. Date: Apr. 10, 2003

(65) Prior Publication Data

US 2004/0261418 A1 Dec. 30, 2004

(51) Int. Cl.
*F02C 7/20* (2006.01)
(52) U.S. Cl. .......................... 60/796; 415/119; 60/785; 60/725
(58) Field of Classification Search .................. 60/785, 60/796, 797, 798, 801, 725, 728, 39.83, 39.091, 60/39.092, 726; 415/119; 290/52
See application file for complete search history.

(56) References Cited

U.S. PATENT DOCUMENTS

| | | | | |
|---|---|---|---|---|
| 3,056,539 A | * | 10/1962 | Pullin | 417/203 |
| 3,402,881 A | * | 9/1968 | Moore et al. | 415/47 |
| 3,485,442 A | * | 12/1969 | Mitchener et al. | 415/143 |
| 3,705,491 A | * | 12/1972 | Foster-Pegg | 60/39.55 |
| 3,788,776 A | * | 1/1974 | Post et al. | 417/295 |
| 4,002,023 A | * | 1/1977 | Hartmann | 60/797 |
| 4,057,371 A | * | 11/1977 | Pilarczyk | 417/409 |
| 4,487,014 A | * | 12/1984 | Vinciguerra | 60/797 |
| 5,355,074 A | | 10/1994 | Nakano | 322/1 |
| 5,537,813 A | * | 7/1996 | Davis et al. | 60/775 |
| 5,560,195 A | * | 10/1996 | Anderson et al. | 60/785 |
| 5,622,044 A | * | 4/1997 | Bronicki et al. | 60/39.182 |
| 5,649,418 A | | 7/1997 | Ludwig | 60/39.33 |
| 6,027,304 A | * | 2/2000 | Arar et al. | 415/116 |
| 6,082,094 A | * | 7/2000 | Longardner et al. | 60/801 |
| 6,134,878 A | | 10/2000 | Amako et al. | 60/39.33 |
| 6,226,974 B1 | * | 5/2001 | Andrew et al. | 60/772 |
| 6,250,068 B1 | | 6/2001 | Tajima et al. | 60/39.33 |
| 6,449,957 B1 | * | 9/2002 | Takamatsu et al. | 60/796 |
| 6,685,425 B1 | * | 2/2004 | Poccia et al. | 415/116 |
| 6,786,034 B1 | * | 9/2004 | Liebig et al. | 60/39.41 |
| 6,802,690 B1 | * | 10/2004 | Han et al. | 415/119 |

* cited by examiner

*Primary Examiner*—William H. Rodriguez
(74) *Attorney, Agent, or Firm*—Hayes Soloway P.C.

(57) ABSTRACT

Arrangement at a gas turbine installation for the generating of electricity, where inlet air filter housing, bleed air outlet and inlet for the vent air to the turbine housing are integrated into two units, an upper filter housing and a lower intermediate housing connected to the turbine housing. The lower intermediate housing includes a silencer for the inlet air that at the same time connects the filter housing with the turbine inlet. The compressor bleed air system is divided into two parts, one in the intermediate housing and one extending through the filter housing. The vent air for the turbine housing is drawn in through an end wall of the filter housing and down into the turbine housing through separate spaces surrounding the compressor bleed ducting in the filter and intermediate housings.

7 Claims, 2 Drawing Sheets

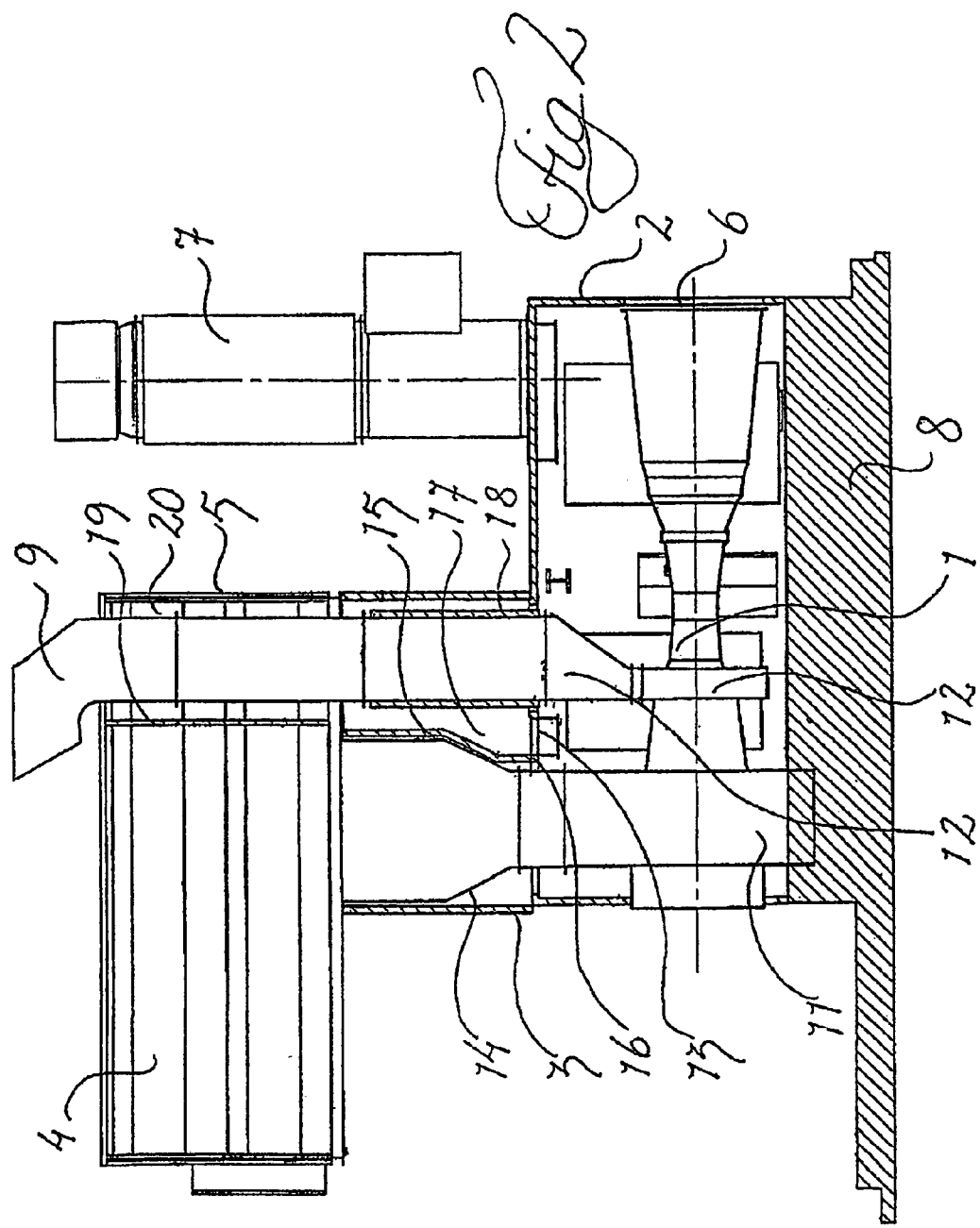

GAS TURBINE ARRANGEMENT HAVING AN INTEGRATED FILTER HOUSING AND COMPRESSOR BLEED DUCT

TECHNICAL FIELD

The present invention is generally related to gas turbines and, more particularly, is related to a gas turbine arrangement having an integrated filter housing and compressor bleed duct.

BACKGROUND OF THE INVENTION

Increasingly electric power is provided by gas turbine driven generators. A major advantage of gas turbine driven generators is that they can be installed practically everywhere to provide a local supply of electricity to support the local power supply distribution. This type of installation may also be used to drive pumps or compressors. A typical installation includes housings for the turbine and the generator, respectively. Additionally, air inlets with filters are coupled to the turbine housing. A venting system for the turbine/generator housing is also present and corresponding outlets are also included. Air that has passed the low pressure inlet compressor is partly bled off via a compressor bleed system and released into the ambient atmosphere. The reduction in combustion air is synchronized with a reduction in fuel and results in a power reduction. The compressor bleed system is a heavy and large structure which including ductwork, acoustics and a load bearing structure.

Since the prior arts' gas turbine driven generators in most cases are placed close to the users, the installations are decentralized and exist in large numbers. In reality this means that the installation personnel often are unskilled and unfamiliar with the mounting of this type of systems, especially with the installation of the inlet housing and the different air ducts. For the proper functioning and security of the machinery as well as for personnel is safety, it is important every device is correctly mounted and fastened on the turbine housing. This is rather time consuming work and in a normal case takes approximately three to four weeks to complete and since installation sites are geographically dispersed, it is likely that local inexperienced labor is used to install the system.

A particular problem is that it is necessary to properly fit the filter housing to the gas turbine inlet, and also offset the structure in relation to the turbine housing. The filter housing is therefor supported with a separate support structure. This requires many site adjustments to avoid misalignment. If the foundation is not correct set, the filter housing will become misaligned laterally or vertically in relation to the turbine housing. This will require adjustments onsite and may possibly lead to leaks or sealing problems between components. Leakage in the inlet system causes a rapid degradation of turbine performance.

Thus, a heretofore unaddressed need exists in the industry to address the aforementioned deficiencies and inadequacies.

SUMMARY OF THE INVENTION

The object of the invention is to overcome the aforementioned problems, to facilitate the assembly of the turbine system and reduce the risk of mistakes, even when unskilled labor is used to assemble the housing, inlet filters, etc.

The above object is achieved by integrating the air filter housing and a part of or the entire compressor bleed system into one unit. The center of gravity for the integrated unit will be shifted sufficiently to provide a stable support for the system without the above mentioned frame and thus, eliminate one major source of misalignment. Since the filter housing and the compressor bleed system is heavy, this system allows for a good, well sealed and immediate fit of the integrated filter housing and compressor bleed system on the turbine housing.

The housings are preferably provided with sealing and positioning means as well as means for anchoring the housings together.

Another preferred feature is that the air inlet for venting the turbine housing is integrated with the filter housing and compressor bleed system. It is particularly advantageous if the venting passage surrounds the compressor bleed system. The venting passage may in some cases even surround the silencer in the lower intermediate part. This feature allows for weight and sound reductions.

An advantageous further feature of the invention is separating the compressor bleed system into two parts. Furthermore, the venting, if present, may also be divided into two parts and, on the inlet side, the silencer and the inlet filters are separated from each other. This separating of the ducts allows for a lateral integration of the resulting parts into an upper unit and a lower unit. A lower unit closest to the turbine housing contains a silencer, and a part of the duct of the compressor bleed air from the turbine; a second top part contains a filter housing and the upper part of the compressor bleed air duct. This arrangement allows for a considerable displacement of the center of gravity, caused by the heavy duct for the compressor, and thus no separate frame is needed for the support of the filter housing. At the same time, the lateral integration enables all sections of the upper unit as well as the lower or intermediate part to be assembled at the factory prior to delivery. This means that there is only three parts that have to be assembled on site and since these parts are to be assembled in series with each other, the possibilities to make mistakes on site are greatly reduced. The elimination of the separate support structure for the filter housing also reduce the risk for people and equipment.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a cross-sectional view of the gas turbine installation constructed in accordance with the present invention as shown in FIG. 1.

DETAILED DESCRIPTION

Figure 1:
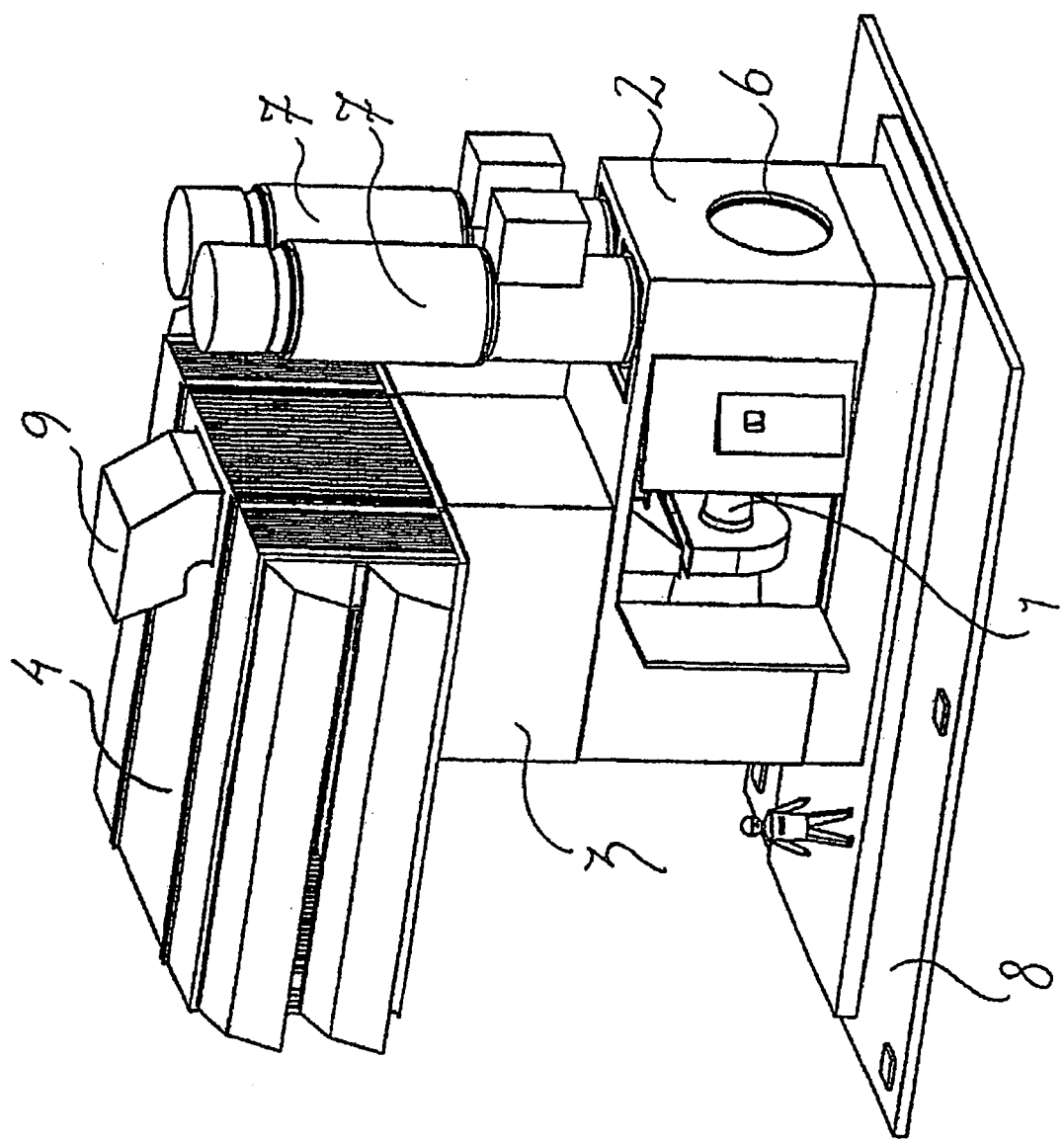
FIG. 1 is a perspective view of a gas turbine installation constructed in accordance with the present invention.

The preferred embodiment of the gas turbine installation of the present invention, shown in FIGS. 1 and 2, includes a gas turbine 1 placed inside a housing 2. An intermediate housing 3 rests on the top of the turbine housing 2 and on top of housing, a filter housing 4 is arranged, through which the inlet air to the turbine is taken. Element 5 is an inlet to allow fresh air into the turbine housing. A gas outlet 6 is arranged at the end of the turbine housing and coupled to a vertically funnel (as shown). On the roof of the turbine housing, two outlet tubes 7, run from the inner portion of the turbine housing. These outlets evacuate the air inside the turbine housing. The tubes 7 are provided with fans to blow the air. However, these tubes are normally only operated one at a time. The gas turbine housing rests on a concrete base plate 8. On top of the filter housing is a compressor bleed air outlet 9 for air that is bled away from the compressor of the turbine when a power reduction is wanted. On the inlet end of the turbine housing 2, a generator (not shown) is coupled to the turbine.

The gas turbine 1 has an inlet air distributor 11 enclosing the inlet end of the turbine and extending up towards the roof of the gas turbine housing 2.

The gas turbine also has a bleed air outlet duct 12 that extends around the turbine and up to the roof of the gas turbine housing. This duct 12 contains a slide valve for the power control of the turbine 2.

The roof of the turbine housing is furthermore provided with an inlet vent opening 13 to feeding fresh air to the inside of the gas turbine housing.

On the roof of the gas turbine housing, the intermediate housing 3 is arranged such that its bottom has openings corresponding to the aforementioned openings in the roof of the gas turbine housing. In the intermediate housing, a silencer 14 for the inlet air to the turbine extends from the top of the intermediate housing to its bottom. The silencer 14 location corresponds to that of the inlet air distributor 11 in the turbine housing 2.

Close to the silencer, a partition 15 separates a remaining compartment 17 in the intermediate housing. The partition 15 has a short tube 16 in the bottom extending into the opening 13 in the roof of the turbine housing. In the roof part of the intermediate housing, the compartment 17 for the inlet vent air is open over a larger part of its roof area. In some installations, the partition may be left out so that the vent air also surrounds the silencer.

Through the compartment 17 for the incoming vent air extends a vertical tube 18. The vertical tube 18 constituting a part of the compressor bleed ducting. The tube 18 extends a short distance down through the roof of the turbine housing for coupling together with the bleed outlet duct 12 via a slide valve (not shown). The tube 18 extends upwards to just below the top of the intermediate part 3.

Arranged on top of the intermediate housing is the filter housing 4. The filter housing 4 contains an opening in the bottom corresponding to the inlet of the silencer 14. The filter housing 4 contains numerous inlet filters.

The outlet 9 for the air, that is bled off from the compressor, is fastened to the roof of the filter housing and is provided with an extension that reaches to the tube 18 in the intermediate housing. This creates a continuous passage from the turbine to the outlet on top of the filter housing.

A partition 19 screens off a compartment 20 from the inner section of the filter part of the filter housing 4. A filter provided opening 5 is arranged in the end of the filter housing to permit ambient air to be sucked in through the filter 5, then further through the compartments 20 and 17 into the turbine housing, and finally through this and out through either of the fan provided outlet tubes.

Considerable sound alteration is achieved by running the tubes for the bleed off air through the compartments transporting the vented air. This also results in an increased structural strength. This increased structural strength can permit weight reductions, in particular, the ducting of the compressor.

The housings may be additionally provided with coupling means for fast initial connecting and additional couplings to secure the parts together in the future.

The offset of the intermediate and filter housings caused by the location of the connections of the turbine itself may still cause an uncentered load on the turbine housing. However, the filter housing can be set down for maintaining on top of the intermediate housing without any additional support since the integration of the heavy outlet 9 balances the filter housing. If necessary, in extreme cases, two pillars or struts may be inserted and adjusted to the correct height below the outer corners of the filter housing after the mounting. Alternatively, pull rods may be arranged between the top edges of turbine housing and filter housing.

With gas turbine installation of the present invention, number of separate parts delivered to the installation site is minimized. The prior art methods required delivery of over fifty parts. It is now possible to deliver three to four preassembled sections. This reduces site installation time, as well as, risks of non-matching parts on site. Although additional work is required at the factory, this additional work can be done very efficiently compared to the huge amount of site work required by the prior art. Furthermore, the present invention results in less parts and volume to freight as well as less risks of transport and handling damages.

Site work is simplified in terms of complexity and logistics using the present invention. The typical assembly time on site for one turbine package can be reduced from three to four weeks to one week. The invention also results in considerable cost saving and lead-time reduction.

Additionally, the invention will also result in a more professional and organized outward appearance and reduction in wind resistance. The improved appearance will also mean less nooks and corners where sand, leafs or snow can accumulate.

In some cases, the foundation for the turbine housing may be too weak to support the weight of the filter housing. For such cases, it may still be appropriate to use a separate frame to support the filter housing. Also, in this case, it is still a great advantage to use the invented integration of filter housing and the compressor bleed air duct, since this results in a reduction of the weight that has to be carried by the turbine housing. This means that the intermediate part may still be supported directly on the turbine housing and a resilient sealing means may be inserted between the filter housing and the intermediate housing. Since the pressures are comparatively low such a seal may have a great degree of compression and thus making it easy for it to compensate for different distances and also differing inclinations.

The above mentioned sealing means may alternatively be inserted below the intermediate housing, such that it may be suspended in the filter housing or integrated within.

It should be emphasized that the above-described embodiments of the present invention are merely possible examples of implementations, merely set forth for a clear understanding of the principles of the invention. Many variations and modifications may be made to the above-described embodiments(s) of the invention without departing substantially from the spirit and principles of the invention. All such modifications and variations are intended to be included herein within the scope of this disclosure and the present invention and protected by the following claims.

What is claimed is:

1. An arrangement at a gas turbine installation, wherein an inlet filter housing and a compressor bleed ducting are integrated to one unit that in its bottom or floor part is provided with corresponding openings or connections facing corresponding openings in a roof of a gas turbine housing and further comprising a venting conduit for the turbine housing arranged in the integrated unit of filter housing and compressor bleed ducting.

2. An arrangement according to claim 1, wherein the venting conduit at least partly surrounds the compressor bleed ducting.

3. An arrangement according to claim 1, wherein the integrated filter housing and compressor bleed ducting is subdivided into an upper filter housing and a lower intermediate housing and, a silencer is arranged in the intermediate housing.

4. An arrangement according to claim 1, wherein a partition separates a space for the vent inlet air.

5. An arrangement according to claim 1, wherein a vent air intake is in the end of the filter housing that contains a bleed outlet.

6. An arrangement at a gas turbine installation, wherein an inlet filter housing and a compressor bleed ducting are integrated to one unit that in its bottom or floor part is provided with corresponding openings or connections facing corresponding openings in a roof of a gas turbine housing, wherein the filter housing is supported on a separate framework and connected to an intermediate housing or turbine housing via a resilient or adaptable seal.

7. An arrangement according to claim 6, wherein the intermediate housing is suspended in the filter housing.

* * * * *